July 20, 1926.
J. B. LA PIERRE
STEERING WHEEL
Filed Nov. 7, 1925
1,592,947
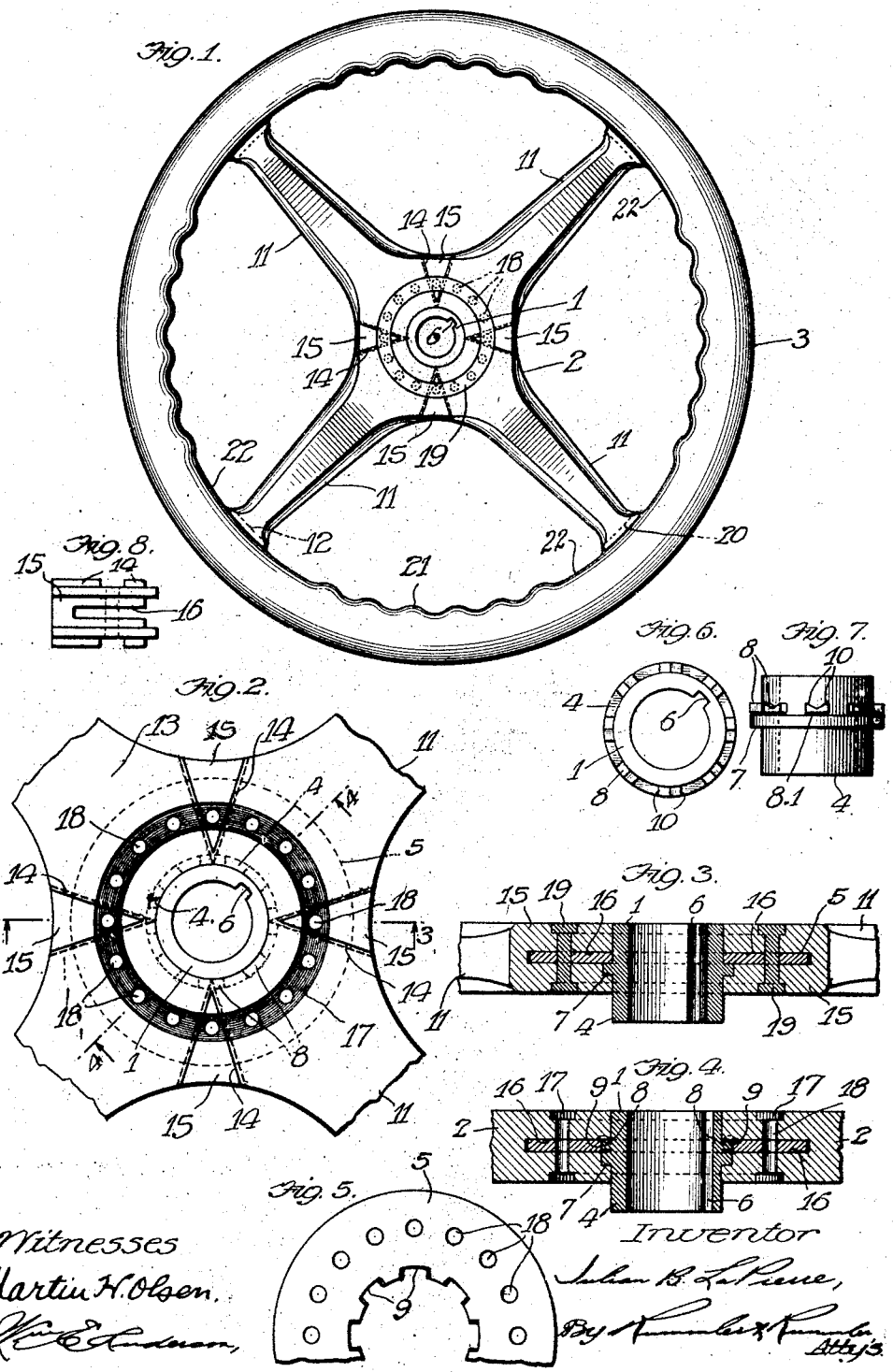

Patented July 20, 1926.

1,592,947

UNITED STATES PATENT OFFICE.

JULIAN B. LA PIERRE, OF CHICAGO, ILLINOIS.

STEERING WHEEL.

Application filed November 7, 1925. Serial No. 67,526.

The main objects of this invention are to provide improved means for joining together two abutting members; to provide improved means of this kind for rigidly securing together the arms of a spider; to provide an improved form and arrangement of filler blocks adapted to form a part of the hub structure of the spider; and to provide means of this kind which is particularly adapted for use in connection with wooden or composition spiders of steering wheels for securing the arms to each other and to the metal hub.

An illustrative embodiment of this invention is shown in the accompanying drawing, wherein:—

Figure 1 is a plan of a steering wheel to which this invention is applied.

Fig. 2 is an enlarged fragmentary view of the hub portion of the spider without the tenon member.

Fig. 3 is a transverse section taken on the line 3—3 of Fig. 2, and showing also the tenon member.

Fig. 4 is a transverse section taken on the line 4—4 of Fig. 2.

Fig. 5 is a fragmentary plan of the annular flange of the metal hub.

Fig. 6 is a top plan of the central sleeve of the metal hub.

Fig. 7 is a side elevation of the same.

Fig. 8 is an elevation of a filler block.

In the specific form shown, the improved steering wheel comprises a metal hub 1 mounted in a non-metallic spider 2 which is rigidly secured to an annular rim 3.

A metal hub is required on all steering wheels employing a wooden or composition spider in order to strengthen the wheel and to resist wear on the parts engaging the steering post. In the construction shown, the hub 1 comprises a central sleeve 4 adapted to embrace the steering post (not shown), and having rigidly secured thereto an annular flange 5 adapted to be embedded in the spider 2 for securing the metal hub to the spider. The sleeve 4 is provided with the usual keyway 6 for engagement with a key in the steering post. Formed on the sleeve 4, is a peripheral flange 7, against which the flange 5 is firmly seated. Extending around the periphery of the sleeve 4, is a plurality of radially projecting lugs 8 which engage notches 9 formed in the inner periphery of the flange 5. Formed on the outer edges of the lugs 8, are shoulders 10 adapted to be swaged over the adjacent face of the flange 5 for firmly securing it to the sleeve 4. The lugs 8 are cast integral with the annular flange 7 and, in order to take away any fillets which might be formed in the corners between the lugs and flange, a groove 8.1 is cut between the lugs 8 and flange 7, so as to permit the flange or disc 5 to seat squarely against the flange 7.

In the specific form shown, the improved spider 2 comprises a plurality of radially disposed arms 11, rigidly secured together at their inner ends to form a unitary hub structure, and having their outer extremities formed to provide seats 12 which are curved longitudinally in the plane of the wheel and also transversely thereto to conform to the shape of the rim at the point of connection, so as to insure tight fitting joints. The inner ends of the arms 11 are slightly enlarged to form heads 13 having their extremities concaved to conform to the hub sleeve 4 and having radially disposed side faces 14. In a common type of wooden spider heretofore in use, the inner ends of the arms have been shaped so as to abut the opposed edges of the adjacent arms. With such a construction, there was a considerable waste of material, because each arm was cut from a single piece of material having sufficient width to form the enlarged head at the inner end thereof. Wooden spider arms are generally tapered outwardly for ornamental purposes and, when constructed in a single piece, there is considerable waste of material.

In the present improved construction, wedge-shaped filler blocks 15 are inserted between the opposed faces 14 of the spider arms and rigidly secured thereto so as to form a part of the hub structure. With this improved construction there is very little waste of material because the arms 11 may be cut from comparatively narrow strips and the filler blocks may be formed of scrap which has heretofore been discarded or used as fuel. The tapered side faces of the filler blocks 15 and the abutting faces 14 of the spider arms are preferably grooved to provide interfitting portions which may be flued together to form a tight joint. The filler blocks 15 and the inner ends of the spider arms are centrally grooved to provide an annular seat 16 for the metal hub flange 5.

In the construction shown, the faces of the filler blocks 15 and spider arms 11 are substantially flush and are recessed to provide a pair of annular grooves 17 on opposite sides of the hub structure which communicate with each other through cavities 18 extending transversely through the filler blocks 15, heads 13 and metal hub flange 5. The grooves 17 and cavities 18 are adapted to receive molten metal, cement, or like fluid which solidifies to form a tenon member 19 for rigidly securing the spider parts to each other and to the metal hub.

A spider to which this invention is applied may be completely formed and have its surface finished apart from the rim before the wheel is assembled or, if desired, the individual spider arms may be rigidly secured together at the hub after their outer ends have been secured to the rim section. The former method of assembly is to be preferred because it permits a considerable saving in labor and expense in the surfacing and coating operations.

When the spider arms are connected together in a unitary structure, as hereinbefore described, before mounting them on the rim, it is desirable to employ certain features of rim construction which are described and claimed in my Patent No. 1,448,132, issued March 13, 1923, for a steering wheel. In this construction, the rim is so shaped on its inner periphery as to allow the spider to be inserted at one position and then rotated in the plane of the rim until it comes to a bearing at the desired bearing points.

In the form shown, the rim 3 is oval in radial cross section, and formed at intervals on its inner periphery, is a plurality of bearing surfaces 20 arranged for interfitting engagement with the seats 12 at the outer extremities of the spider arms 11. The portions of the rim between the bearing surfaces 20 are corrugated, as shown in Figure 1, to provide the usual finger grips 21. The furrows of the corrugations are arranged so as to provide a recess or depression 22 on each side of the bearing surfaces 20. In order to present a uniform and an ornamental appearance, the depressions 22 are herein shown located on both sides of the bearing surfaces 20, but one of such depressions adjacent each bearing surface is sufficient.

After the spider arms 11 and filler blocks 15 have been glued together around the metal hub 1, the spider is placed in a machine for cutting the grooves 17. The parts may then be drilled to provide the cavities 18. In pouring the molten metal or other fluid into the grooves 17 and cavities 18, the spider is placed on a flat supporting surface and sufficient fluid is injected to completely fill the grooves. After the fluid has solidified, any excess thereof projecting beyond the faces of the hub structure may be ground down so as to be flush with the adjacent faces of the spider. The usual metal cap, not shown, is mounted on the hub structure so that, in use, the metal sleeve 4 and tenon 19 will not be visible.

In assembling the wheel, the rim is placed in a suitable support, not shown, having suitable lining to prevent marring of the finish. The spider is then inserted axially within the rim by placing the outer ends thereof in one set of depressions 22. The spider is then partially rotated relative to the rim so as to bring the bearing surfaces 20 and seats 12 into snug interfitting engagement. Any suitable fastening means may be employed for permanently securing the spider arms to the bearing surfaces 20 of the rim.

Although but one specific embodiment of this invention has been herein shown and described, it will be understood that numerous details of the construction shown may be altered or omitted without departing from the spirit of this invention as defined by the following claims.

I claim:

1. A device of the class described comprising a pair of members having substantially flush faces provided with a groove continuous across the opposed edges of said members, said members having cavities extending inwardly from said groove, and a tenon member formed by injecting a fluid into said groove and cavities, said fluid being of such a character that it will solidify.

2. A device of the class described comprising a pair of members having substantially flush faces provided with a groove continuous across the opposed edges of said members, said members having cavities extending inwardly from said groove, and a tenon member formed by injecting molten metal into said groove and cavities.

3. A device of the class described comprising a pair of members having substantially flush faces on opposite sides thereof provided with a pair of grooves extending across the opposed edges of said members, said members having cavities providing communication between said grooves, and a tenon member formed by injecting a fluid into said grooves and cavities, said fluid being of such a character that it will solidify.

4. A device of the class described comprising a plurality of radially disposed members having substantially flush faces provided with a groove extending across the opposed edges of said members, said members having cavities extending inwardly from said groove, and a tenon member formed by injecting a fluid into said groove and cavities, said fluid being of such a character that it will solidify.

5. A device of the class described comprising a plurality of radially disposed abutting members arranged to form a hub structure provided with a groove extending across the abutting edges of said members, said members having cavities extending inwardly from said groove, and a tenon member formed by injecting a fluid into said groove and cavities, said fluid being of such a character that it will solidify.

6. A device of the class described comprising a plurality of radially disposed abutting members arranged to form a hub structure provided with an annular groove extending across the abutting edges of said members, said members having cavities extending inwardly from said groove, and a tenon member formed by injecting a fluid into said groove and cavities, said fluid being of such a character that it will solidify.

7. A devce of the class described comprising a plurality of radially disposed abutting arms arranged to form a hub having a pair of annular grooves formed in the opposite sides thereof and continuous across the abutting edges of said arms, said arms having cavities providing communication between said grooves, and a tenon member formed by injecting a fluid into said grooves and cavities, said fluid being of such a character that it will solidify.

8. A steering wheel spider comprising a plurality of radially disposed arms having substantially flush faces provided with an annular groove, said arms having cavities communicating with said groove, and a tenon member formed by injecting a fluid into said groove and cavities, said fluid being of such a character that it will solidify.

9. A steering wheel spider comprising a plurality of arms having radially disposed abutting edges and substantially flush faces, said faces having an annular groove continuous across said abutting edge, said arms having cavities communicating with said groove, and a tenon member formed by injecting a fluid into said grooves and cavities, said fluid being of such a character that it will solidify.

10. In a device of the class described, the combination with a spider comprising a plurality of radially disposed abutting arms provided with a groove extending across the abutting edges thereof, of a hub having a peripheral flange, said arms and flange being recessed to provide cavities communicating with said groove, and a tenon member formed by injecting a fluid into said groove and cavities, said fluid being of such a character that it will solidify.

11. In a device of the class described, the combination with a spider comprising a plurality of radially disposed abutting arms arranged to form a hub structure provided with an annular groove extending across the abutting edges of said arms, of a separate hub having a peripheral flange embedded in said arms, said arms and flange having cavities communicating with said groove, and a tenon member formed by injecting a fluid into said groove and cavities, said fluid being of such a character that it will solidify.

12. In a device of the class described, the combination with a non-metallic spider comprising a plurality of radially disposed abutting arms arranged to form a hub structure having a pair of annular grooves formed in the opposite sides thereof and continuous across the abutting edges of said arms, of a metal hub having a peripheral flange embedded in said arms, said arms and flange having registering cavities providing communication between said grooves, and a tenon member in said grooves and cavities for securing said arms to one another and to said flange.

13. In a device of the class described, the combination with a non-metallic spider comprising a plurality of radially disposed abutting arms arranged to form a hub structure having a pair of annular grooves formed in the opposite sides thereof and continuous across the abutting edges of said arms, of a metal hub having a peripheral flange embedded in said arms, said arms and flange having registering cavities providing communication between said grooves, and a tenon member formed by injecting a fluid into said grooves and cavities, said fluid being of such a character that it will solidify.

14. In a device of the class described, a spider comprising a plurality of arms having radially disposed edges, wedge-shaped filler blocks arranged between said edges in interfitting engagement with said arms, said arms and filler blocks having substantially flush faces provided with a groove extending across the abutting edges thereof, said arms and filler blocks having cavities communicating with said groove, and a tenon member formed by injecting a fluid into said groove and cavities, said fluid being of such a character that it will solidify.

Signed at Chicago this 23rd day of Sept. 1925.

JULIAN B. LA PIERRE.